US012588666B2

(12) United States Patent (10) Patent No.: US 12,588,666 B2
Borovsky et al. (45) Date of Patent: Mar. 31, 2026

(54) FISHING LURE

(71) Applicant: One Cast Tackle LLC, Maple Grove, MN (US)

(72) Inventors: Joshua Daniel Borovsky, Maple Grove, MN (US); Bennett Dale Johnson, Parkers Prairie, MN (US)

(73) Assignee: One Cast Tackle LLC, Maple Grove, MN (US)

( * ) Notice: Subject to any disclaimer, the term of this patent is extended or adjusted under 35 U.S.C. 154(b) by 352 days.

(21) Appl. No.: 18/522,730

(22) Filed: Nov. 29, 2023

(65) Prior Publication Data

US 2024/0172730 A1 May 30, 2024

Related U.S. Application Data

(60) Provisional application No. 63/385,439, filed on Nov. 30, 2022.

(51) Int. Cl.
*A01K 85/12* (2006.01)
(52) U.S. Cl.
CPC .................................. *A01K 85/125* (2022.02)
(58) Field of Classification Search
CPC ...... A01K 85/125; A01K 85/10; A01K 85/18; A01K 85/12; A01K 85/025; A01K 85/1823; A01K 85/029; A01K 85/1843; A01K 85/1851; A01K 85/00; F16B 7/00; F16B 7/02; F16B 7/025; F16B 7/0406; F16B 7/042

USPC .............. 43/42, 42.09, 42.19, 42.36; 403/1; 63/12, 13, 14.1, 14.7; 24/437, 326, 343, 24/369, 136 R, 115 M, 455, 573.09, 24/574.1, 580.1, 582.1, 588.1, 590.1, 24/592.1, 597.1, 597.2, 598.1, 598.3
See application file for complete search history.

(56) References Cited

U.S. PATENT DOCUMENTS

| | | | | |
|---|---|---|---|---|
| 1,371,310 A | * | 3/1921 | Joy ....................... | H01H 85/044 24/369 |
| 1,467,116 A | * | 9/1923 | Reekers ................. | A01K 85/10 43/42.19 |
| 1,710,102 A | * | 4/1929 | Moore ................... | A01K 85/10 43/42.48 |
| 2,244,378 A | * | 6/1941 | Turner ................... | A01K 85/12 403/165 |
| 2,780,022 A | * | 2/1957 | Arntzen ................. | A01K 85/16 43/44.6 |
| 3,758,976 A | * | 9/1973 | Szwolkon .............. | A01K 83/00 43/43.16 |
| 4,030,225 A | * | 6/1977 | Earley ................... | A01K 91/04 43/42.49 |
| 4,248,003 A | * | 2/1981 | Thesz ................... | A01K 83/06 43/44.8 |
| 4,617,753 A | * | 10/1986 | Pauley ................... | A01K 85/10 43/42.19 |

(Continued)

*Primary Examiner* — Timothy D Collins
*Assistant Examiner* — Maria E Graber
(74) *Attorney, Agent, or Firm* — Merchant & Gould P.C.

(57) ABSTRACT

A housing that is intended to spin on a fishing lure shank and designed to hold blades. The housing can be reusable by incorporating mechanical means that enable the user to swap out blades of different styles, colors, or shapes. There is a hollow tube that runs the long distance of the housing that could be of different cross-sectional shape than the fishing lure shank it is spinning on.

20 Claims, 8 Drawing Sheets

(56) References Cited

U.S. PATENT DOCUMENTS

| | | | | | |
|---|---|---|---|---|---|
| 4,628,630 | A * | 12/1986 | Bohme | ................. | A01K 91/08 |
| | | | | | 24/136 L |
| 4,791,749 | A * | 12/1988 | Stazo | .................... | A01K 85/00 |
| | | | | | 43/42.39 |
| 4,803,798 | A * | 2/1989 | Hannah | ................. | A01K 95/00 |
| | | | | | 43/43.13 |
| 4,864,765 | A * | 9/1989 | Vanderplow | .......... | A01K 85/10 |
| | | | | | 43/42.19 |
| 4,884,359 | A * | 12/1989 | Wray | .................... | A01K 85/10 |
| | | | | | 43/42.43 |
| 5,299,379 | A * | 4/1994 | Hawk | ................... | A01K 91/04 |
| | | | | | 24/607 |
| 5,681,351 | A * | 10/1997 | Jamiolkowski | .... | A61B 17/0487 |
| | | | | | 606/232 |
| 6,233,863 | B1 * | 5/2001 | Dotson | ................. | A01K 85/00 |
| | | | | | 43/42.38 |
| 6,508,029 | B2 * | 1/2003 | Grindley | ............... | A01K 85/12 |
| | | | | | 43/42.46 |
| 6,601,336 | B1 * | 8/2003 | Link | ...................... | A01K 85/00 |
| | | | | | 43/42.11 |
| 6,658,785 | B1 * | 12/2003 | Faulkner | ............... | A01K 83/06 |
| | | | | | 43/44.2 |
| 10,123,520 | B2 * | 11/2018 | Furuya | .................. | A01K 83/00 |
| 10,595,521 | B2 * | 3/2020 | Stanley | ................. | A01K 97/06 |
| 11,229,193 | B2 * | 1/2022 | Erickson | ............... | A01K 85/10 |
| 11,653,638 | B2 * | 5/2023 | Fox | ......................... | F16B 2/005 |
| | | | | | 43/44.89 |
| 12,433,275 | B2 * | 10/2025 | Shemesh | ............... | A01K 85/00 |
| 12,458,006 | B2 * | 11/2025 | Daniels | ............... | A01K 85/122 |
| 2002/0157300 | A1 * | 10/2002 | Saul | ...................... | A01K 85/00 |
| | | | | | 43/42.33 |
| 2003/0159331 | A1 * | 8/2003 | Pasley | ................... | A01K 85/00 |
| | | | | | 43/42.15 |
| 2006/0042147 | A1 * | 3/2006 | Jenkins | ................. | A01K 85/16 |
| | | | | | 43/42.36 |
| 2009/0044441 | A1 * | 2/2009 | Neal | ..................... | A01K 91/04 |
| | | | | | 43/43.1 |
| 2011/0035987 | A1 * | 2/2011 | Nicholson, III | ....... | A01K 85/00 |
| | | | | | 43/42.4 |
| 2021/0007339 | A1 * | 1/2021 | Priore | ................... | A01K 95/02 |
| 2023/0148577 | A1 * | 5/2023 | Nelson | .............. | A01K 85/1847 |
| | | | | | 43/17.6 |
| 2024/0156074 | A1 * | 5/2024 | Daniels | ............... | A01K 85/122 |
| 2025/0241281 | A1 * | 7/2025 | Keating | ................ | A01K 85/18 |

* cited by examiner

FISHING LURE

RELATED APPLICATION(S)

This patent application is related to U.S. Patent Application No. 63/385,439 filed on Nov. 30, 2022, the entirety of which is hereby incorporated by reference.

BACKGROUND

This invention relates to class a of fishing lures that have spinning components on the shank of a fishing lure. These lures are typically unable to have components switched out if damaged or for example, a new color or shape is wanted. These lures are also designed to spin as freely as possible on the shank of a fishing lure.

SUMMARY

In examples provided herein, a housing is intended to spin on a fishing lure shank and designed to hold blades. The housing can be reusable by incorporating mechanical means that enable the user to swap out blades of different styles, colors, or shapes. There is a hollow tube that runs the long distance of the housing that could be of different cross-sectional shape than the fishing lure shank it is spinning on.

BRIEF DESCRIPTION OF DRAWINGS

FIGS. 7A-7D show the housing when over the shank of a fishing lure.

FIGS. 8A-8D show the reusable housing when over the shank of a fishing lure.

DETAILED DESCRIPTION OF FIGURES

Figure 2B:
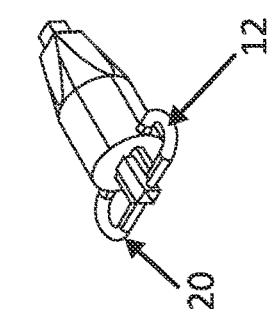
FIGS. 2A-2D show a housing with two attachment rods opposite of each other.
Figure 2D:
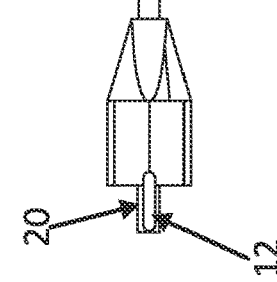
Figure 2A:
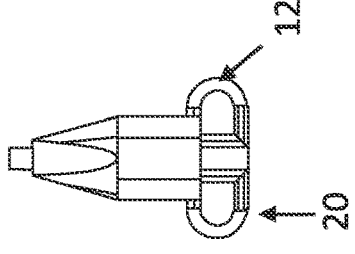
Figure 2C:
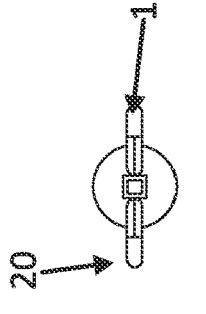
Figure 1B:
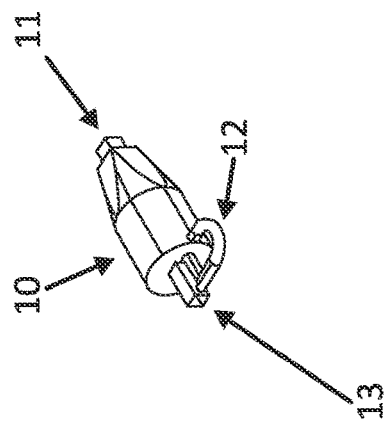
FIGS. 1A-1D show a housing with one attachment rod.
Figure 1D:
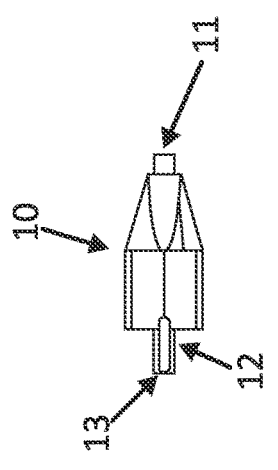
Figure 1A:
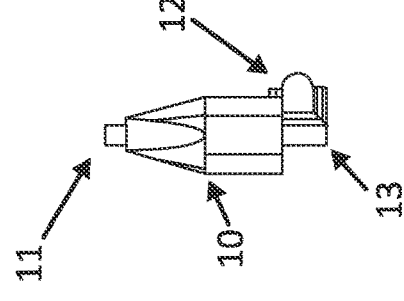
Figure 1C:
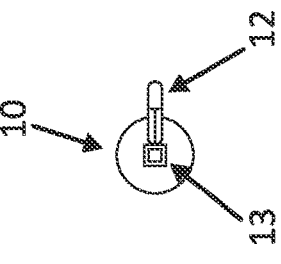
Figures 3A, 3B, 3C, 3D, 4A, 4B, 4C, 4D:
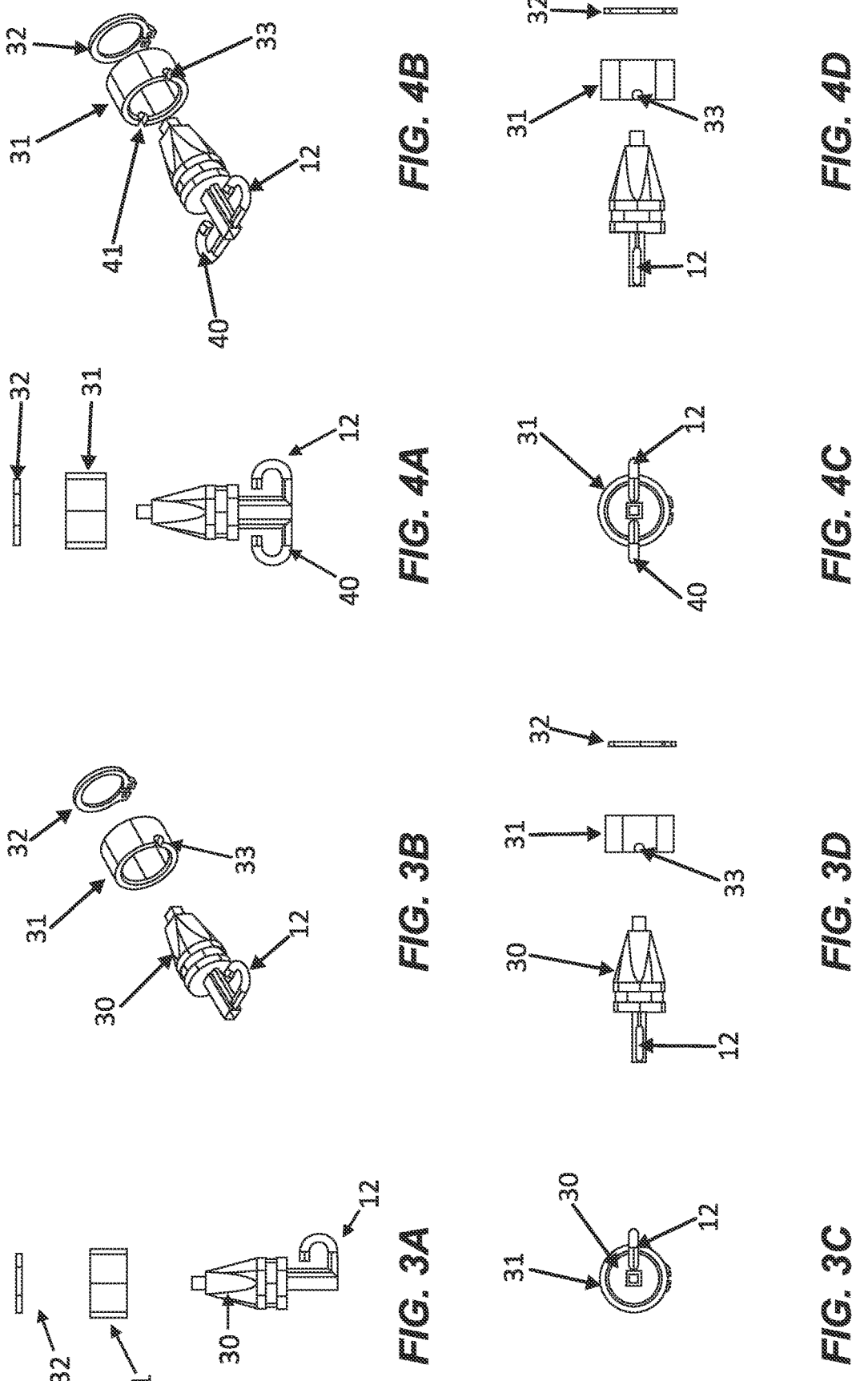
FIGS. 3A-3D show an exploded view of a reusable housing with one attachment rod.
FIGS. 4A-4D show an exploded view of a reusable housing with two attachment rods opposite of each other.
Figure 6B:
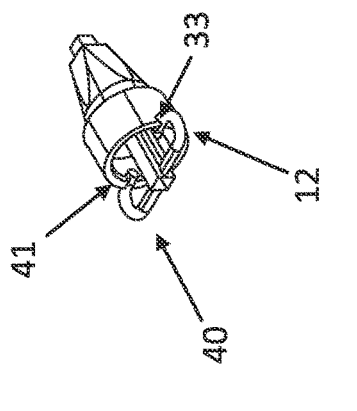
FIGS. 6A-6D show a reusable housing with two attachment rods opposite of each other
Figure 6D:
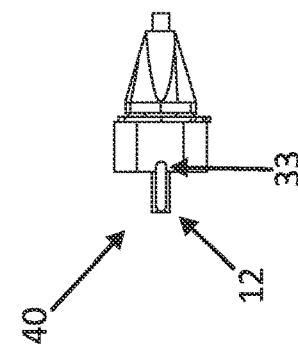
Figure 6A:
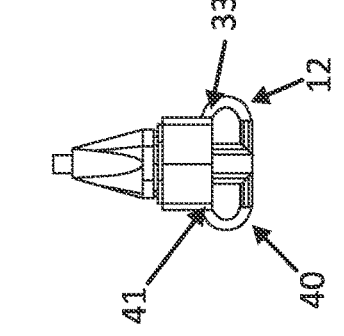
Figure 6C:
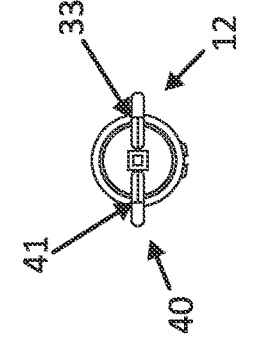
Figure 5B:
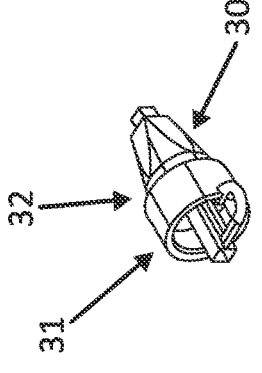
FIGS. 5A-5D show a reusable housing with one attachment rod.
Figure 5D:
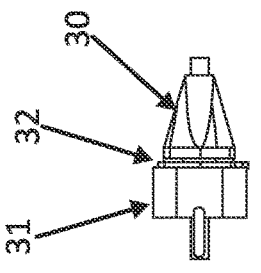
Figure 5A:
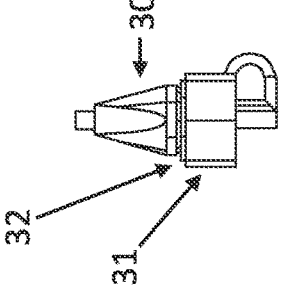
Figure 5C:
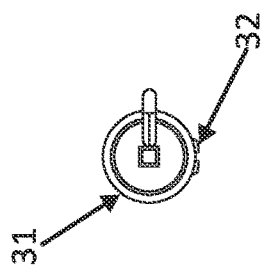
Figures 7A, 7B, 7C, 8A, 8B, 8C, 8D:
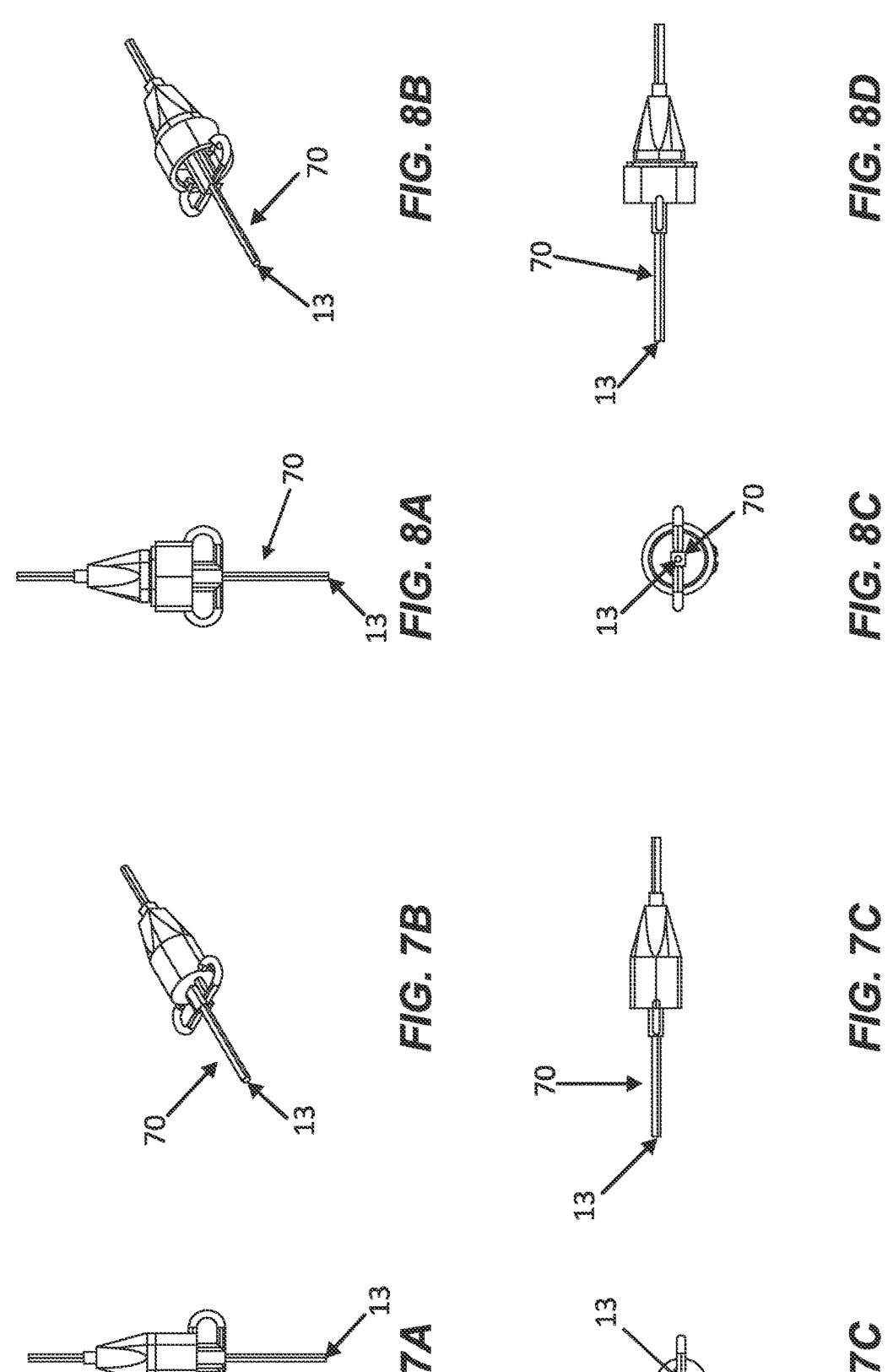
Figure 9B:
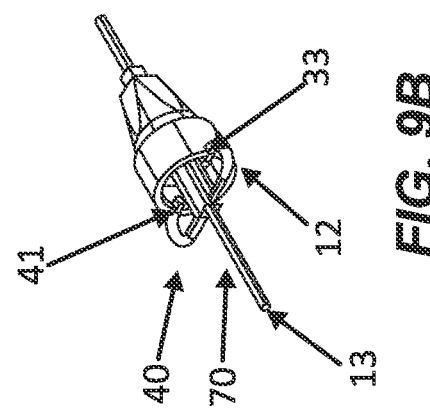
FIGS. 9A-9D show the reusable housing with two attachment rods with respect to an XYZ axis.
Figure 9D:
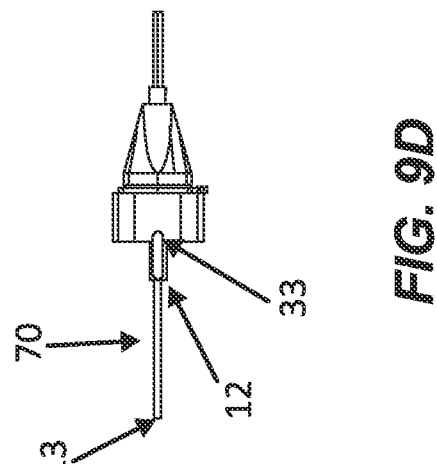
Figure 9A:
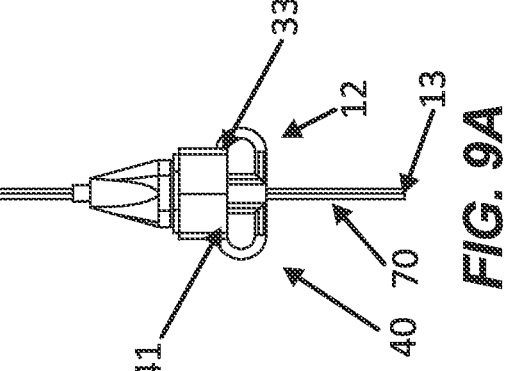
Figure 9C:
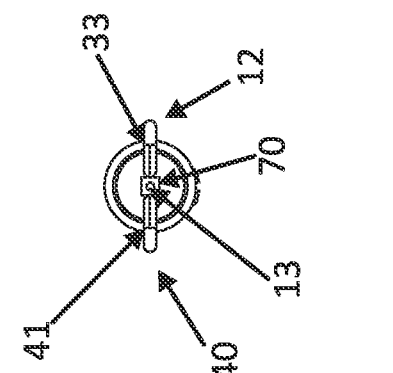

There is a need for a fishing lure with a housing that could have a mechanism that allows for quick changing of blades or a housing that does not spin freely on the shank thereby producing a different sound to the fish.

In the examples provided herein, a housing is intended to spin on a fishing lure shank and designed to hold blades. The housing can be reusable by incorporating mechanical means that enable the user to swap out blades of different styles, colors, or shapes. There is a hollow tube that runs the long distance of the housing that could be of different cross-sectional shape than the fishing lure shank it is spinning on.

FIGS. 1A-1D show a housing 10, a hollow tube that runs from the proximal end to the distal end 11, and a rod 12 in the shape of a semi-circle, where blades 120 (see, e.g., FIGS. 12-13) can be attached. FIGS. 1A-1D also show the cross section of the hollow tube 13, this hollow tube is shown as square (e.g., non-circular), however it can be many different shapes (e.g., rectangle, triangle, hexagonal, or octagonal). FIGS. 2A-2D have similar components to FIGS. 1A-1D, but with the addition of a second rod 20, opposite the first rod 12.

In example embodiments, the rods 12, 20 are bent. An outside radius of the bend for each of the rods 12, 20 can be 0.280 inches (with a tolerance of +0.000-0.010). Other configurations are possible. In some examples, the rods 12, 20 are made of 0.062 music wire. Other configurations are possible.

The square cross-section on the inside of the hollow tube 13 spinning on a round wire can give the lure a unique sound to which fish seem attracted. This differs from a tube with a round cross-section. In other embodiments, the inside of the hollow tube 13 can be any geometry other than round (e.g., non-spherical), as described above. The non-spherical shapes can rattle and spin on the wire, giving them some unique sound profiles to which fish respond positively.

In examples, the tubing is made of brass, although other types of materials (e.g., stainless steel) can be used. The shank can be made of steel wire or stainless steel wire. Many other materials can be used.

FIGS. 3A-3D and 4A-4D show a reusable housing 30 in an exploded view. The reusable housing 30 has an outer dimension that is the same as the inner dimension of the collar 31. Above the collar 31 is a snap ring 32 that will ensure the collar 31 does not fall off the housing 30. In alternative designs, the collar 31 can attach to the housing 30 using different methods, such as with a twist lock. For instance, the collar 31 can be attached to the housing 30 using an O-ring. Such a configuration may make it much easier to change blades 120 and not require a snap ring pliers to do so. Many other configurations are possible.

The reusable housing 30 in FIGS. 3A-3D is shown with only one attachment rod 12. The collar 31 has a notch 33, which will mate up to the attachment rod 12. FIGS. 4A-4D has two attachment rods 12 and 40 in opposite directions of each other. The collar 31 for a reusable housing has two notches 33 and 41 designed to mate with the two attachment rods 12 and 40. In an alternative embodiment, there can be three attachment rods spaced evenly around the housing approximately 120 degrees apart.

FIGS. 5A-5D and 6A-6D show how the reusable housing 30 after assembly. The housing 30 is designed for a snug fit to the collar, 31, then the snap ring 32 is the mechanical fastener that ensures the collar 31 does not fall off the housing 30. FIGS. 6A-6D show how the collar with the two notches 33 and 41 is assembled to the two attachment rods 40 and 12.

FIGS. 7A-7D and 8A-8D show a housing and a reusable housing assembled and placed over the shank of the fishing lure 70. The cross section has the hollow tube 13, and it differs from the fishing lure cross sectional shank 70. In example embodiments, the shank 70 can be made of a different material from the hollow tube 13, such as steel or stainless steel wire.

Figure 11:
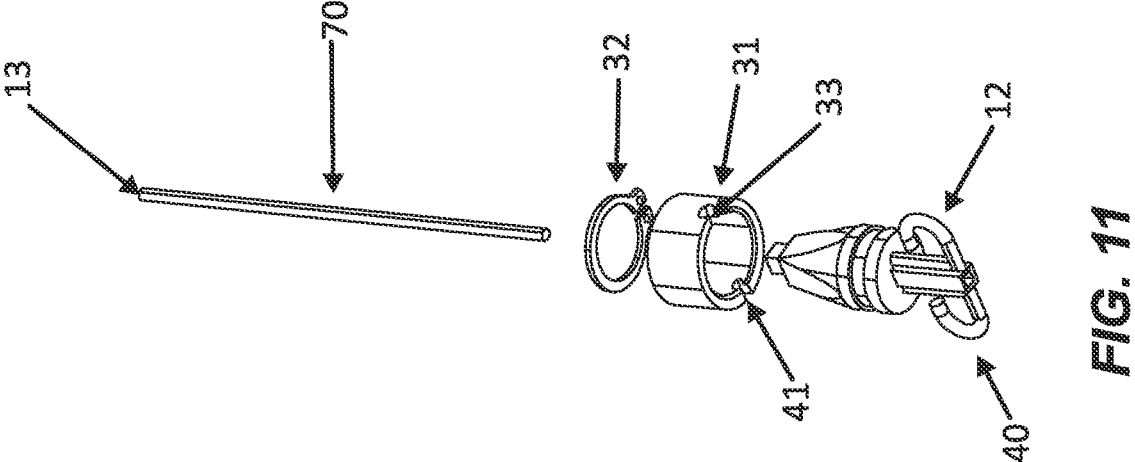
FIG. 11 shows a perspective exploded view of the reusable housing and shank.
Figure 10:
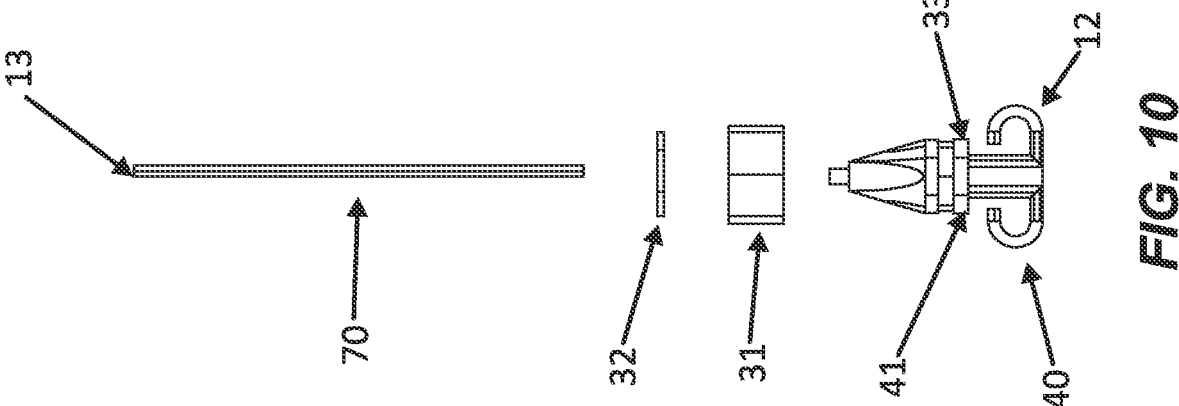
FIG. 10 shows an exploded view of the reusable housing and shank.

FIGS. 9A-9D show an assembled reusable housing with respect to planes X, Y, Z that define it. FIGS. 10 and 11 show exploded views of the same.

Figure 12:
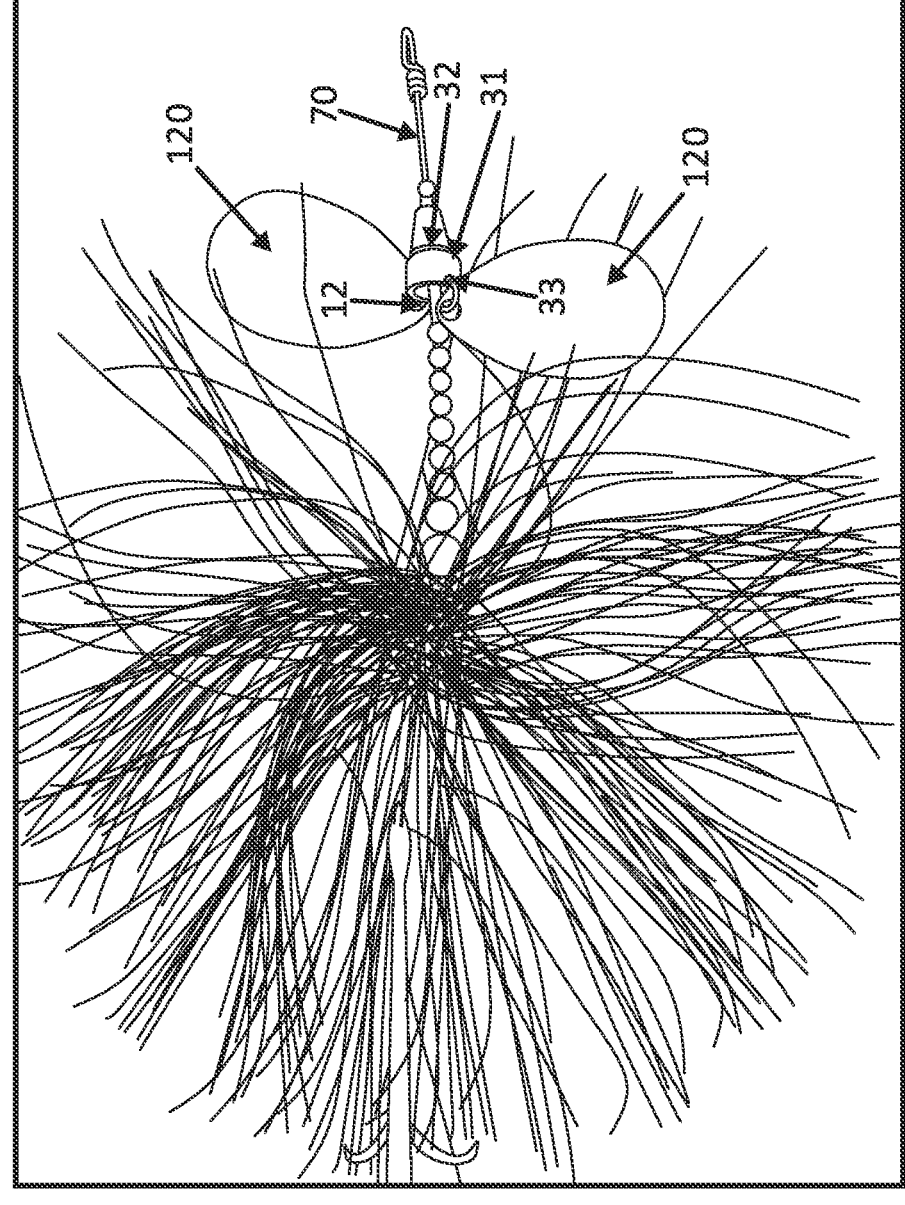
FIG. 12 shows an assembled lure including the reusable housing and shank.
Figure 13:
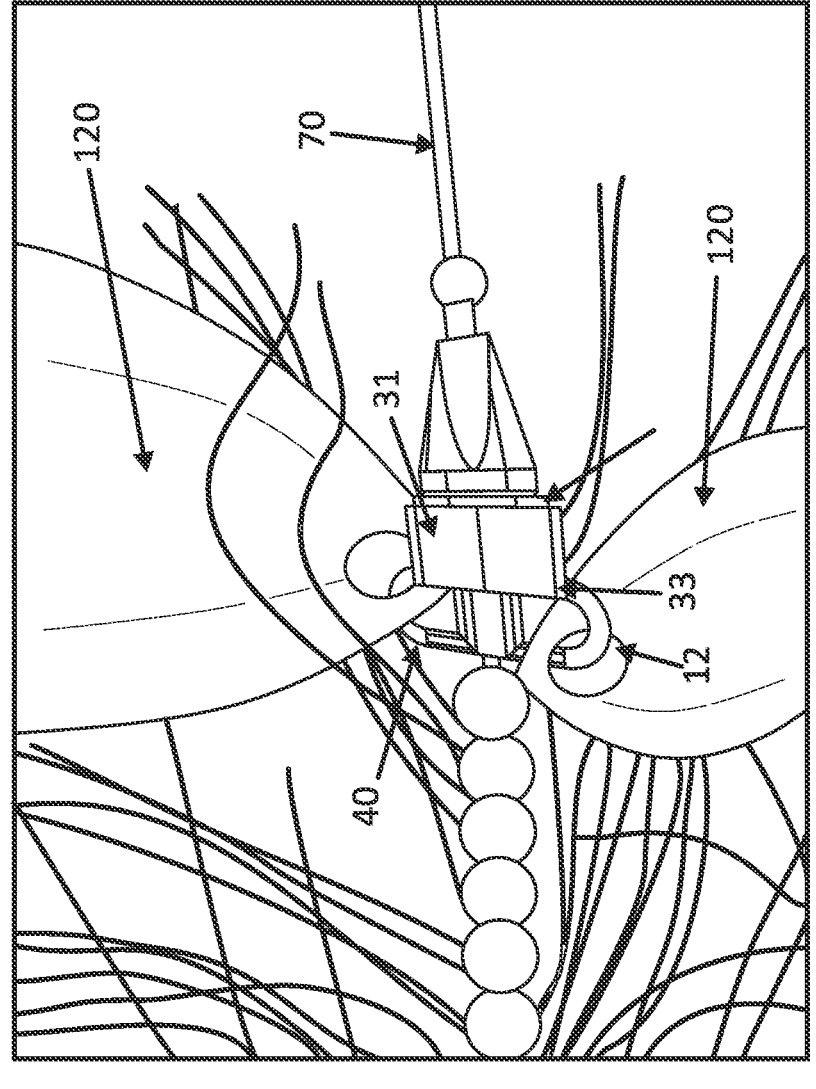
FIG. 13 shows another view of the lure of FIG. 12.

FIGS. 12 and 13 show the reusable housing incorporated into a complete fishing lure.

In example embodiments, the reusable housing 30 can be used on various shanks of fishing lures, inline spinners, spinnerbaits, etc.

What is claimed is:

1. A housing for a fishing lure, comprising:

a distal end and a proximal end, wherein on the distal end there is an attachment rod formed into a semi-circle shape;

a collar towards the proximal end that fits to an exterior of the housing, the collar being removable allowing an end of the attachment rod to be exposed; and a hollow tube running between the distal end and the proximal end designed to slide over a shank of the fishing lure.

2. The housing of claim 1, further comprising a second attachment rod opposite the attachment rod.

3. The housing of claim 1, further comprising a second attachment rod and third attachment rod, wherein the attachment rod, the second attachment rod, and the third attachment rod are spaced evenly around the housing approximately 120 degrees apart.

4. The housing of claim 1, wherein a cross-sectional shape of the hollow tube is of a different shape than a cross sectional of the shank of the fishing lure.

5. The housing of claim 1, wherein a first material of the hollow tube is of different composition than a second material of the shank.

6. The housing of claim 1, wherein the collar is held on by a snap ring.

7. The housing of claim 1, wherein the collar is held on by a tolerance snap fit.

8. The housing of claim 1, wherein the housing spins on the shank of the fishing lure.

9. The housing of claim 1, wherein the attachment rod is designed to secure blades to the housing.

10. The housing of claim 1, wherein the attachment rod is designed to secure objects that are different in shape.

11. The housing of claim 1, wherein the attachment rod is designed to secure objects that are similar in shape.

12. The housing of claim 1, wherein the housing is substantially cone shaped in which a narrow end of the cone is on the proximal end.

13. The housing of claim 1, wherein the collar is of a cylindrical shape.

14. The housing of claim 1, wherein the collar has recessed notches to which the end of the attachment rod fits.

15. The housing of claim 1, further comprising a snap ring and a plurality of blades.

16. The housing of claim 1, wherein a cross-sectional shape of the hollow tube is non-circular.

17. The housing of claim 16, wherein the cross-sectional shape of the hollow tube is square or hexagonal.

18. The housing of claim 1, wherein semi-circle shape of the attachment rod has an outside radius of bend of 0.280 inches.

19. The housing of claim 18, wherein the collar is held on by a snap ring.

20. A housing for a fishing lure, comprising:

a distal end and a proximal end, wherein on the distal end there is an attachment rod formed into a closed loop; and a hollow tube running between the distal end and the proximal end configured to slide over a shank of the fishing lure, wherein a hollow tube cross section is of different shape than a cross sectional shape of the shank of the fishing lure.

* * * * *